United States Patent Office

3,637,540
Patented Jan. 25, 1972

3,637,540
POLYURETHANES FROM FATTY ACIDS AND THEIR PRODUCTION
Per Wolff, Rugmarken, and Hans-Ole Larsen, Mollemarken, Denmark, assignors to Per Wolff and Henning Kaaber, both of Rugmarken, Farum, Denmark, and H. C. Anderson, Bellavista, Switzerland
No Drawing. Filed Oct. 7, 1968, Ser. No. 765,641
Claims priority, application Great Britain, Oct. 12, 1967, 46,671/67; Feb. 20, 1968, 8,268/68
Int. Cl. C08g 22/44
U.S. Cl. 260—2.5 AM                    6 Claims

ABSTRACT OF THE DISCLOSURE

A new group of polyurethanes are described and claimed together with methods for their production, the said polyurethanes resulting from the reaction between a polyisocyanate and a polyol component, a substantial part of which is a reaction mixture of hydrocarbon fatty acid or a lower alkyl ester thereof with dialkanolamine, in which at least about half of the fatty acid has been converted into alkanolamide, and the polyol component contains at least about 25% of monomeric fatty acid radicals.

---

The present invention relates to reaction products of dialkanolamines and fatty acids, and to polyurethane materials derived from them.

Polyurethanes are formed by reaction between a polyisocyanate and a polyhydroxyl component subsequently referred to as polyols.

The polyhydroxyl compounds conventionally used for the production of polyurethanes can be classified as polyesters or polyethers.

The polyesters are prepared from polyfunctional alcohols, such as ethylene glycol, diethylene glycol, trimethylol propane, butylene glycol and glycerol, and polyfunctional organic acids, such as adipic acid and phthalic acid. The molecules contain a plurality of ester linkages and terminal hydroxyl groups.

The polyethers are prepared from a small polyfunctional alcohol, such as glycerol, trimethylol propane, 1,2,6-hexanetriol, pentaerythritol, sorbitol or sucrose, which is treated with propylene oxide or ethylene oxide to give a more or less branched molecule in which the branches contain a plurality of ether linkages and a hydroxyl group.

The polyurethanes of the present invention may be used for a variety of purposes such as adhesives, elastomers and foams, but are particularly useful in the production of rigid polyurethanes.

The physical characteristics and mechanical properties of polyurethanes are primarily dependent upon the structure, molecular size, and functionality of the polyhydroxy compound. Flexible foams should not be too highly cross-linked and are thus usually prepared from polyols with a functionality of between two and three, whereas a high degree of cross-linking is generally thought to be necessary in rigid foams, which are, therefore, normally prepared from polyhydroxy compounds with a functionality of four or higher. Most rigid polyurethane foams are today prepared from polyols having a functionality of six or higher. This large number of reactive sites results in a three dimensional network, and a stable rigid polyurethane foam.

The polyesters and the polyethers are purely synthetic materials. Their production is dependent on an ample supply of bulk chemicals from the petrochemical industry, and their price and availability are linked to the production capacity for such chemicals. Their production further demands large and complicated apparatus and much technical skill, limiting the number of suppliers to the few very big chemical companies.

These and other considerations have made it desirable to find a new class of polyhydroxy compounds suitable for production of polyurethanes, and particularly polyhydroxy compounds which could be prepared from cheap raw materials in ample quantities all over the world, and which could be prepared by a very simple and cheap process making use of simple apparatus and demanding no special techniques or highly trained personel.

An object of the present invention is, therefore, to provide a new class of polyurethanes based on polyols prepared from fatty acids, and particularly from the mixtures of fatty acids derived from natural fats and oils.

The natural fats and oils are cheap raw materials available in enormous quantities in most parts of the world, and fatty acids are often obtained as by-products in chemical processes based upon the natural fats and oils. An important source of fatty acids also is the tall oil which is a mixture of fatty acids and rosin acids obtained as a by-product in the cellulose industry.

It has been proposed, in the preparation of foamed cellular materials, to interact an organic polyisocyanate, an aliphatic hydroxy acid, water, and secondary or tertiary amine containing at least one group reactive towards isocyanates. If the hydroxy acid, for instance, is ricinoleic acid, and the amine is diethanolamine, a rigid foam is said to be obtained, when using the acid and amine in stoichiometric proportions. The various components are simply mixed, which means that the hydroxy acid and diethanolamine forms an ammonium soap with three hydroxyl groups in the molecule. The water reacts with the polyisocyanate to form a polyamine and carbon dioxide. The carbon dioxide thus formed will act as a blowing agent giving the desired cellular structure. The polyamine will react with further amounts of the polyisocyanate forming carbamide cross-links, which will give the necessary rigidity to the foam. However, the hydroxy fatty acids are costly, and the ratio of the expensive polyisocyanate to polyol is unusually high, making a product of this kind incompetitive to other kinds of rigid foams.

It has further been proposed to use alkanolamides produced from dimeric fatty acids in the manufacture of polyurethanes for coating purposes, the dimerized fatty acid being reacted with a surplus of dialkanolamine, the excess being removed by distillation or extraction when the amide formation has been completed. In a second, preferred method, an ester of the dimerized acid, e.g. the methyl ester, is condensed with diethanolamine in a catalyzed reaction at a relatively low temperature, the resulting alcohol, e.g. methanol, being distilled off, as the reaction proceeds. After the amide formation has been completed, the excess reactant materials are distilled off under reduced pressure. Both methods tend to be costly, and demand complicated and expensive apparatus.

The polyurethanes of the present invention are reaction products of a polyisocyanate with a polyol component, and are characterised in that a substantial part of the polyol component is a reaction product between a fatty acid or fatty acid lower alkyl ester and a dialkanolamine, in which at least about half of the fatty acid has been converted into alkanolamide, and the polyol component contains at least about 25% of monomeric fatty acid radicals.

Owing to the low functionality and the comparatively high molecular weight of the polyol component, the polyurethanes of the invention have the advantage of an unusually low ratio of isocyanate to polyol, reflecting in low costs of manufacture.

The use of the amide-containing reaction product as such without isolating the amide also makes the manufacture exceedingly simple and without necessitating expensive apparatus.

In a preferred embodiment of the present polyurethanes, the fatty acid is a naturally occurring fatty acid, e.g. a tall oil fatty acid mixture.

In another embodiment of the polyurethanes of this invention, the fatty acid is a mixture of the kind derived from naturally occurring fats or oils. As formerly mentioned, such fatty acids are often recovered as by-products and are, therefore, easily available and cheap raw materials.

The preferred dialkanolamine for use in the preparation of polyols for the polyurethanes of the invention is diethanolamine, again on account of availability and for economical reasons.

Another preferred dialkanolamine for use in the polyurethanes of the invention is diisopropanolamine. Polyol components containing the reaction product between fatty acid and diisopropanolamine generally have a slower rate of reaction with the polyisocyanate. This makes it easier to control the formation of the polyurethane which is an advantage in many applications, for example in the preparation of rigid foam. Further, polyols prepared from diisopropanolamine can give a rigid foam using unusual low ratios of polyisocyanate to polyol which is an economic advantage.

Other dialkanolamines such as for example 3,3-dipropanolamine, dibutanolamine and mixtures of dialkanolamines can also be used.

In a preferred embodiment, the polyurethanes of the present invention are in the form of rigid foams.

Naturally occurring hydrocarbon fatty acids are generally monocarboxylic and thus, when reacted with the dialkanolamine under conditions where the amide formation is the predominant reaction, a dihydric compound is obtained.

It has surprisingly been found that rigid foams of good quality can be obtained in spite of the low functionality of the applied polyol components.

It is supposed, but not certain, that the reason for the high degree of dimensional stability that can be achieved in such foams in spite of the lower average functionality of the polyhydroxyl component, is that the polyurethanes from the dialkanolamide polyols have a higher "glass transition temperature" (i.e. the temperature at which a polymer changes from a hard brittle state to a tough rubbery state) than the usual polyurethanes. The structures one can visualize for such foams will be very densely cross-linked areas surrounded by a "cloud" of hydrocarbon chains from the fatty acids; these hydrocarbon chains being attached to the cross-linked areas via the very polar amide group. The hydrocarbon chains are thus isolated from the polar parts of the polymer, and any kind of a plasticizing action from the hydrocarbon is thus reduced. The amide group itself gives a very high melting temperature. Also the possibility of an ordered arrangement of the hydrocarbon chains within the "cloud" is favoured, which should also lead to a higher glass transition temperature.

An advantage of the rigid polyurethane foams of the present invention is that they are unusually tough with a high resistance towards impact and vibrational fatigue. This is very important in structural applications such as moulded shells in furniture. In the performance tests proposed by the British Furniture Industry Research Association for shell chairs moulded with rigid polyurethane foams, the rigid polyurethane of the present invention shows great advantages over the conventional polyurethanes moulded from polyether or polyester polyols. For example, in one test a load is applied at right angles to the surface of the chair back 4" down from the top of the back. The chair is prevented from tipping backwards by a downward vertical force of 224 lbs. The back load is applied repeatedly at about 40 cycles a minute.

A chair moulded from a conventional polyether polyol system designed for structural applications failed after 65,000 applications of 85 lbs. load. The same chair moulded to the same density from a polyurethane foam of the present invention passed 150,000 applications without any sign of failure.

The invention further comprises a process for the manufacture of the present polyurethanes, which is characterized in preparing a dialkanolamide by heating to a temperature of about 25° C. to about 190° C. the hydrocarbon fatty acid with dialkanolamine in the ratio of 1 mole of the former to 0.8 to 2.5 moles of the latter, the heating to be continued at least until the acid value has dropped to at least about 50% of the initial value after which the reaction mixture, with a possible admixture of polyol, is reacted with a polyisocyanate component.

The reaction between dialkanolamine and fatty acid is easily conducted so that the desired amide is formed, the hydroxyl groups of the dialkanolamine remaining unblocked. This is important, since side reactions may set in involving the hydroxyl groups, which have to be available for reaction with the polyisocyanate.

One such side reaction is the disproportionation of two moles of dialkanolamide into one mole of dialkanolamine and one mole of amidoester in which one fatty acid radical has replaced the hydrogen in one of the hydroxyl groups of the dialkanolamide.

Other side reactions are the splitting-off of water from two moles of dialkanolamine forming among other compounds substituted piperazines.

It is not essential that the amide formation should be carried to completion before mixing the reaction product with the polyisocyanate, and in fact the best polyurethanes for the production of, for instance, rigid foam are obtained if the reaction is stopped before completion.

Lower alkyl esters of fatty acids are generally considerably more expensive than the corresponding acid. Under certain circumstances, however, it may be advantageous to prepare the polyols of the present invention from such esters. We have found that unreacted esters will act as softeners in the resulting polyurethane. We have further found that the alcohol formed by the reaction between fatty acid ester and dialkanolamine should substantially be removed before the reaction with polyisocyanate.

Thus the invention further comprises a process for the manufacture of the present polyurethanes which comprises heating a hydrocarbon fatty acid lower alkyl ester with dialkanolamine in the ratio of 1 mole of the former to 0.8 to 2.5 moles of the latter, the heating to be continued at least until 85% of the ester have reacted with the dialkanolamine and 80% of the alcohol formed in the reaction have been removed, after which there the reaction mixture, with a possible admixture of polyol, is reacted with a polyisocyanate component.

As formerly stated, the dialkanolamide-containing polyol component may have another polyol or polyols admixed, which according to the invention can be an ammonium soap of a dialkanolamine and hydrocarbon fatty acid.

Thus, in an embodiment of the present process, fatty acid is reacted with a substantial surplus of dialkanolamine, the surplus of amine in the reaction mixture being at least partially neutralized by admixing fatty acid before the polyurethane formation. The advantage of using fatty acid in neutralizing excess of dialkanolamine, which in itself is a polyol capable of reacting with a polyisocyanate, is to further reduce the polyisocyanate to polyol ratio, thus saving some of the more costly polyisocyanate.

In order to get foams, an embodiment of the present process is characterized in that a blowing agent is present during the reaction with the isocyanate. Any conventional blowing agent used in the manufacture of polyurethane foam may be applied, but also the low cost petrol ethers may be used.

Preferred fatty acids or fatty acid mixtures to be used in the present process are the tall oil fatty acids. Thus tall oil itself may be used.

Other preferred fatty acids are the fatty acid mixtures derived from naturally occurring fats and oils.

Both kinds of fatty acids are available in large quantities and at reasonable costs.

It is not essential that the fatty acids employed consist only of monomeric fatty acids. In fact certain properties, such as high temperature performance and closed cell contents, may be improved by using a fatty acid mixture derived from blown or polymerized oil. Also fatty acid mixtures derived from the polymerization of fatty acids may be used.

Generally polymerised fatty acids are considerably more expensive than the corresponding monomeric acids, and generally only technical mixtures containing a significant amount of unconverted monomeric acid will be sufficiently cheap to be commercially attractive for use in the present process.

Fatty acid mixtures which may be used in the present process are thus technical mixtures of polymerized fatty acids containing at least about 25% of unpolymerised fatty acid.

More expensive fatty acid mixtures may be used for some applications, but to bring down the cost it is then preferred to admix sufficient monomeric fatty acid in the form of the dialkanolammonium soap to bring the content of monobasic fatty acid radicals in the polyol component up to at least about 25%.

The preferred dialkanolamines are diethanolamine and diisopropanolamine, but also others, such as dipropanolamine and dibutanolamine may also be used, when available.

In the production of the polyurethanes and rigid foams thereof, any of the commercially available polyisocyanates may be used, such as toluene diisocyanate, methylene bis(4-phenyl isocyanate) and polymethylene polyphenyl isocyanate, together with the usual catalysts, blowing agents and silicone surfactants.

An advantage of the dialkanolamide-containing polyol components used for the polyurethanes of the present invention is that in many cases they can give polyurethane foams with very fine cell structure (20 to 150$\mu$ as compared to the usual 100 to 500$\mu$) without use of or with substantially less of the expensive silicone surfactants which are necessary in conventional polyols as cell regulators.

Another advantage of the dialkanolamide-containing polyols is that their viscosity generally is much lower than the viscosity of the conventional polyols. Whereas conventional polyols for rigid foam have viscosities between 10,000 and 250,000, the dialkanolamide-containing polyols can have viscosities as low as 1,200 centipoises. This makes handling, mixing with isocyanate, and pouring or spraying of the mixture much simpler.

An unusual and advantageous property of the dialkanolamide-containing components used for the polyurethanes of the present invention is that, on account of the combination of the non-polar fatty acid chain and the strongly polar dialkanolamide group, they are compatible with a broad range of both polar and non-polar substances.

For instance, they can be mixed with and blown by means of the cheap-petrol-ether (generally referred to as petroleum ether) blowing agents. This blowing agent either alone or mixed with Freons is a preferred blowing agent which, apart from economical advantages, also gives very good control of the expansion of the polyurethane foam during moulding operations.

Another advantage is that said polyol components are compatible with non-polar mineral oils and tars, which may function as very cheap extenders.

A further advantage is that said polyol components are compatible with the polar polyether polyols and can be used in combination with them.

Said polyol components are also compatible with many polar and nonpolar polymers.

Amide and ester contents of the polyols are found by infrared analyses, using 5% solutions in chloroform. The amide (including any amido ester) is calculated from the peak at 1625 cm.$^{-1}$, using a sample of pure N,N-bis-(2-hydroxyethyl)stearic amide as standard.

The aminoester content (including any amidoester) is calculated from the peak at approx. 1725 cm.$^{-1}$, using a sample with known content of 2-(2-hydroxyethylamino) ethyl stearate.

Hydroxyl values are determined by the ASTM phthalic anhydride method. In the samples this value is recalculated and expressed as "hydroxyl equivalent weight." These "hydroxyl equivalent weights" stem from hydroxyl groups as well as reactive amino roups as both will react with the isocyanate.

The following examples are illustrative of the manufacture of the polyurethanes of the invention and rigid foams produced therefrom.

EXAMPLE 1

A mixture of soybean oil fatty acid (acid value 198, saponification value 199) (284 g.) and diethanolamine (210 g.), (ratio of amine to fatty acid 2:1), is heated undr stirring to 160° C. Nitrogen is bubbled through the reaction mixture, and the exhaust gas is passed through a cold trap to collect water.

The reaction is followed by measuring the amount of water formed in the reaction.

During the reaction, samples are withdrawn and analysed.

The results are given in the following table.

| Sample No. | Reaction time, hours at 160° C. | Reaction water, ml. | OH— eq. wt. | Meq./g. | | | | |
|---|---|---|---|---|---|---|---|---|
| | | | | Amide | Ester | Amine | Acid | Piperazine |
| 1 | 1½ | 11.5 | 107 | 1.67 | 0.13 | 2.97 | 0.64 | 0.19 |
| 2 | 2 | 15.5 | 108 | 1.78 | 0.16 | 2.72 | 0.49 | 0.22 |
| 3 | 2½ | 18 | 111 | 1.97 | 0.20 | 2.31 | 0.27 | 0.29 |
| 4 | 3 | 20 | 114 | 1.96 | 0.25 | 2.07 | 0.09 | 0.34 |
| 5 | 5½ | 23 | 127 | 2.12 | 0.18 | 1.70 | 0.00 | 0.56 |

Rigid polyurethane foams are prepared from the reaction product, using the following recipes; where the figures are parts by weight:

| | Sample No. | | | | |
|---|---|---|---|---|---|
| | 1 | 2 | 3 | 4 | 5 |
| Foam | A | B | C | D | E |
| Sample | 26.8 | 27.0 | 27.8 | 28.5 | 36.8 |
| Silicone surfactant | 0.2 | 0.2 | 0.2 | 0.2 | 0.2 |
| Armeen DMCD | 0.1 | 0.1 | 0.1 | 0.1 | 0.1 |
| Petrol ether | 4.7 | 4.7 | 4.8 | 4.8 | 5.0 |
| PAPI | 37.0 | 37.0 | 37.0 | 37.0 | 37.0 |
| Cream time, sec.[1] | 2 | 2 | 3 | 3 | 5 |
| Rise time, sec.[2] | 40 | 40 | 45 | 45 | 45 |

[1] Cream time is the time elapsed from mixing of the components until foaming starts.
[2] Rise time is the time from mixing until the foam no longer expands.

The resulting foams have the following properties:

(A) This foam is very inhomogeneous, collapsed and brittle.

(B) This foam is better than A, but still inhomogeneous and brittle.

(C) Excellent foam with excellent properties and very fine cell size averaging 60$\mu$, and the sample shows no shrinkage during moulding.

(D) This foam has a more coarse cell structure than

Foam C, and shows some shrinkage.
(E) Very coarse cell structure and much shrinkage.

EXAMPLE 2

In this example, reaction products of soybean fatty acids, average molecular weight 284, and diethanolamine, molecular weight 105, are prepared using different temperatures and mole ratios, as shown in the following table.

| Reaction No. | A | B | C |
|---|---|---|---|
| Temperature, ° C | 130 | 1:0 | 190 |
| Mole ratio, acid/amine | 1:1 | 1:1.5 | 1:2 |

The reaction is carried out the same way as shown in Example 1, using one mole of acid.

The following analytical results are obtained:

| | Water collected, mls. | Percent acid | OH, eq. wt. |
|---|---|---|---|
| A | 17.2 | 5 | 252 |
| B | 11.5 | 26.0 | 138 |
| C | 24.5 | 3.8 | 123 |

Rigid polyurethane foams are prepared, using the following recipes: (parts by weight)

| | A | B | C |
|---|---|---|---|
| Reaction mixture | 30.1 | 28.2 | 30.7 |
| Glycerol | 4.7 | 0.5 | |
| Silicone surfactant | 0.15 | 0.15 | 0.2 |
| Armeen DMCD (dimethyl cocosamine) | 0.65 | 0.1 | 0.1 |
| Petrolether | 5.9 | 3.0 | 5.0 |
| Isocyanate: MDI A and B, PAPI C | 45.0 | 37.0 | 37.0 |
| Cream time, sec | 25 | 8 | 1-2 |
| Rise time, sec | 75 | 55 | 20-25 |

MDI is a crude methylene bis(4-phenyl isocyanate PAPI is a crude polymethylene polyphenyl isocyanate.

The foams are tough and rigid with an average coil size of 40µ–60µ. The cream time of mixture C is too short for batchwise mixing and the foam is not homogeneous. Foam A is excellently suited for moulding of structural elements.

EXAMPLE 3

A technical mixture of branched fatty acids, H 680 from Unilever Emery (acid value 186, saponification value 200, iodine value 48), 37.8 kgs. was mixed with 28.35 kgs. diethanolamine and the mixture was heated to 160° C. Nitrogen was bubbled through the reaction mixture and the exhaust gas was cooled in a condenser to collect the water formed by the reaction.

The progress of the reaction was followed by measuring acid values and the amount of water collected.

| Reaction time, hours | Temperature, ° C. | Acid value, mg. KOH/g. | Water collected, litres |
|---|---|---|---|
| 0 | 25 | | 0 |
| 0.5 | 135 | | 0 |
| 1.0 | 148 | 77 | 0 |
| 1.5 | 158 | 58 | 0 |
| 2.0 | 158 | 42 | 1.0 |
| 2.5 | 159 | 30 | 1.5 |
| 3.0 | 160 | 19.5 | |
| 3.5 | 161 | 12.5 | 2.0 |
| 4.0 | 160 | 6.8 | |
| 5.0 | 52 | 4.0 | 2.24 |

The resulting polyol had an OH equivalent weight of 109 and a water content of 0.33%. Viscosity at 24° C. was 2180 cp. measured with a Brookfield viscometer.

A foam is prepared from polyol (55 g.), silicone surfactant (0.2 g.), Armeen DMCD (a dimethyl cocusamide catalyst) (0.2 g.), Freon 11 (12 g.), PAPI (polymeric phenyl methane isocyanate) (77.5 g.).

Cream time was 3 seconds. The foam was tough and rigid with a density of 37 kg./m.$^3$ and an average cell size of 40µ.

The low viscosity of the polyol made mixing with polyisocyanate and spraying of the mixture very easy. Also the low cream time and fine cell size of the resulting foam make this polyol very suitable for insulations applied by spraying.

EXAMPLE 4

A technical mixture of monobasic and polymerized fatty acids (1 part H 680+1 part Empol 1022 HM from Unilever Emery; acid value 186, saponification value 198, dimer—=trimer acid content 25%, monobasic acids 75%) 21.0 kg. of H 680+21.0 kg. of 1022 HM were mixed with 22.05 kg. diethanolamine and the mixture was heated to 160° C. (molar ratio of amine to fatty acid 1.4:1). Nitrogen was bubbled through the reaction mixture and the exhaust gas was cooled in a condenser to collect the water formed by the reaction.

The progress of the reaction was followed by measuring acid values and the amount of water collected.

| Reaction time, hours | Temperature, ° C. | Acid value, mg. KOH/g. | Water collected, litres |
|---|---|---|---|
| 0 | 25 | | 0 |
| 0.5 | 130 | | 0 |
| 0.75 | 148 | | 0 |
| 1.0 | 159 | 88 | 0 |
| 1.5 | 160 | 60 | 1.0 |
| 2.0 | 159 | 38 | 1.5 |
| 2.25 | 159 | | 2.0 |
| 2.5 | 160 | 22 | 2.4 |
| 3.0 | 161 | 11 | 2.65 |
| 3.5 | 160 | 7.0 | 2.75 |
| 5.5 | 50 | 4.3 | 2.83 |

The resulting polyol had an OH equivalent weight of 152, a water content of 0.31% and a viscosity at 24° C. of 5120 cp. as measured with a Brookfield viscometer.

A foam is prepared from the above polyol (38.0 g.) glycerol (2.0 g.), silicone surfactant (0.3 g.), Armeen DMCD (0.2 g.), Freon 11 (8.0 g.), and PAPI (52.0 g.).

Cream time was 10 seconds and expansion was completed in 60 seconds. A tough rigid foam was obtained having a density of 41 kg./m.$^3$, an average cell size of 45µ and a compressive strength of 2.3 kg./cm.$^2$.

EXAMPLE 5

A dialkanolamide containing product is prepared by heating 1 mole of coconut fatty acids with 2 moles of diethanolamine at 170° C. and distilling off water until the free fatty acid is below 4%.

Polyurethane foams are prepared from this reaction mixture and various amounts of tall oil.

FOAM A

| | G. |
|---|---|
| Reaction mixture | 43.0 |
| Tall oil | 10.7 |
| Silicone surfactant | 0.5 |
| Petrol ether BP below 50° C. | 8.0 |
| Polyphenyl methane polyisocyanate (MDI) | 76.5 |

Cream time 3 secs. The reaction is difficult to control, but the resulting foam is very rigid.

FOAM B

| | G. |
|---|---|
| Reaction mixture | 43.0 |
| Tall oil | 21.4 |
| Silicone surfactant | 0.5 |
| Petrolether | 8.0 |
| MDI | 81.0 |

Cream time 6 secs. Tough rigid foam with good dimensional stability.

FOAM C

| | G. |
|---|---|
| Reaction mixture | 21.5 |
| Tall oil | 21.5 |
| Silicone surfactant | 0.4 |
| Petrol ether | 4.5 |
| MDI | 4.0 |

Cream time 12 secs. Tough rigid foam with some flexibility.

All the foams have very fine cell structure.

Equivalent results are obtained if the tall oil fatty acid is replaced by a branched fatty acid H 680 from Unilever Emery (acid value 186, saponifiaction value 200, iodine value 48).

EXAMPLE 6

Tall oil containing 2% rosin acids (acid value 196, saponification value 199, iodine value 129) (287 g.) and diethanolamine (105 g.) are mixed at room temperature. The mixture becomes thick and opaque due to the formation of ammonium soaps of the fatty acids. The mixture is heated to 50° C. for a short period to complete the soap formation.

A polyurethane foam is prepared from this soap.

| | P.b.w. |
|---|---|
| Tall oil fatty acid-diethanol ammonium soap | 39.2 |
| Silicone surfactant | 0.4 |
| Freon 11 | 10.0 |
| MDI | 56.8 |

After 8 seconds, the mixture starts to foam. It is obvious that the components are not mixable, and the reacting mass is very inhomogeneous. The resulting foam has collapsed to a large extent, and the product is extremely brittle.

The ammonium soap prepared above is now heated to 170° C. for 2 hours during which time water is distilled off as the ammonium soap is converted into the dialkanolamide. The reaction product can now form a homogeneous mixture with polyisocyanates.

A polyurethane foam is prepared from this reaction product plus further amounts of tall oil and diethanolamine.

| | G. |
|---|---|
| Reaction product of tall oil and DEA | 37.4 |
| Diethanol amine | 10.5 |
| Tall oil | 28.7 |
| Silicone surfactant | 0.4 |
| Freon 11 | 10 |
| MDI | 84 |

The resulting foam is rigid with a density of approx. 60 g./litre.

EXAMPLE 7

In this example, the influence of low molecular weight polyhydric compounds upon the properties of polyurethane foams prepared from a pure difunctional fatty acid alkanolamide is investigated. The diethanolamide of oleic acid prepared from the methyl ester is used as the basis polyol. To this is added small amounts of glycerol or diethanolamine. These mixtures are blended with silicone surfactant and Freon 11, and are reacted with the equivalent amount of MDI. The properties of the resulting polyurethane foams are summarized in the table below. Foam E, added for comparison purposes, was prepared from a commercial difunctional polyetherol.

POLYURETHANE FOAMS FROM OLEIC ACID DIETHANOLAMIDE ODEA

| | Polyol mixture, g. | Average functionality of polyol mixture | Properties of foam |
|---|---|---|---|
| A | ODEA 18.4 | 2.0 | Rigid foam. |
| B | ODEA 18.4, glycerol 1.54 | 2.33 | Tough rigid foam. No tendency to shrink. |
| C | ODEA 18.4, glycerol 3.1 | 2.50 | Do. |
| D | ODEA 18.4, diethanolamine 1.75 | 2.33 | Do. |
| E | Polypropylene glycol '400' 20.0, glycerol 1.54 | 2.33 | Soft semiflexible foam. |

EXAMPLE 8

One mole of a technical mixture of polymerised fatty acids, Empol 1022 HM from Unilever Emery (acid value 186, saponification value 196, monobasic acid approximately 50%, dimer and trimer acid approximately 50%) is reacted with one mole of diethanolamine at 160° C. until the acid value is 6, water being distilled off during the reaction. The resulting reaction mixture has a hydroxyl value (including active amine) of 254, and contains 0.5% water.

Foam is prepared from the reaction mixture (87 g.), propylene glycol (16 g.), silicone surfactant (0.5 g.), Freon 11 (trichloro fluoromethane) (26 g.), PAPI (polymeric phenyl methane isocyanate) (121 g.), Armeen DMCD (dimethyl cocus amine) (1.0 g.). Foaming starts 33 seconds after mixing and is completed in 120 seconds.

The foam is rigid and tough with a compressive strength of 1.9 kg./cm.$^2$ at a density of 41 kg./m.$^3$.

EXAMPLE 9

Diethanolamine (210 g., 2 mole) and sodium methoxide (1.3 g.) were heated to 110° C. Linseed fatty acid methyl ester was added slowly over a period of 20 minutes.

After the addition of ester, the reaction was continued for 1 hour under reduced pressure to facilitate removal of methanol formed during the reaction. The resulting product consisted essentially of pure dialkanolamide and had an OH equivalent weight of 188.

Foams were prepared from the following:

| | Parts by weight | |
|---|---|---|
| Foam | A | B |
| Linseed fatty acid diethanelamide | 28.0 | 28.0 |
| Propylene glycol | 5.0 | |
| Water | | 0.77 |
| Silicone surfactant | 0.15 | 0.15 |
| Armeen DMCD | 0.6 | 0.6 |
| MDI polyisocyanate | 42.0 | 35.0 |
| Foaming starts after (sec.) | 33 | 21 |
| Foaming is completed after (sec.) | 65 | 51 |
| Density in kg./m.$^3$ | 42 | 35 |

Foams A and B are tough rigid foams with closed cell contents of approximately 80% and 90%, respectively.

EXAMPLE 10

A mixture of 1 mole (105 g.) diethanolamine and 1 mole (284 g.) soybean oil fatty acid (acid value 198), is heated to 160° C. with stirring. Nitrogen is bubbled through the reaction mixture, and the exhaust gas is passed through a cold trap to collect water formed in the reaction.

After a reaction time of 1 hour, 5½ ml. water have been collected in the cold trap, and a sample remains clear when mixed with TDI.

The reaction mixture is then cooled and analysed with the following results: OH equivalent weight 204, water 0.75%.

A polyurethane foam is prepared using:

Reaction—30.6 p.b.w.
Glycerol—5.0 p.b.w.
Silicone surfactant—0.2 p.b.w.
DMCD—0.5 p.b.w.
Petrol ether—5.8 p.b.w.
MDI—46.0 g.
Average OH equivalent weight—115
Start of foaming—after 25 seconds
Foaming completed—after 130 seconds The resulting foam is excellent, showing a shrinkage of about 2%, specific weight 38 g./litre, and a compressive strength of 1.7 kg./cm.$^2$.

EXAMPLE 11

A mixture of soybean fatty acid (1 mole, 284 g.) and diisopropanolamine (1.5 moles, 198 g.) is reacted at 190° C. with stirring. Nitrogen is bubbled through the reaction mixture until 14.5 millilitres of water has been collected, indicating that about 80% of the acid have been converted to amide.

The reaction is then stopped, and the product is cooled. The amount of free acid is 12% of the original value, as determined by titration. OH eq. w. is measured to 153.

Rigid polyurethane foam is prepared, using the following recipe:

| | G. |
|---|---|
| Reaction mixture | 40.5 |
| Silicone surfactant | 0.2 |
| Armeen DMSD | 0.3 |
| Petrol ether | 4.8 |
| PAPI | 39.6 |

A rigid foam is obtained with cell size about 100μ, a density of 42 kg./m.$^3$, shrinkage 4%, and compression strength 1.5 kg./cm.$^2$.

We claim:
1. A rigid polyurethane obtained by the reaction of an organic polyisocyanate and a polyol component, the polyol component comprising a reaction product obtained by heating to a temperature of about 25° C. to about 190° C. one mole of a hydrocarbon fatty acid or fatty acid lower-alkyl ester with from 0.8 to 2.5 moles of dialkanolamine, the heating being continued at least until about half of the said fatty acid being present in the said reaction product in the form of alkanolamide, and wherein said polyol component contains at least about 25% of monomeric fatty acid radicals.

2. A polyurethane according to claim 1, in which the fatty acid is a naturally accurring fatty acid.

3. A polyurethane according to claim 1, in which the fatty acid is of the kind derived from naturally occurring fats or naturally occurring oils.

4. A polyurethane according to claim 1, in which the dialkanolamine is diethanolamine.

5. A polyurethane according to claim 1, in which the dialkanolamine is diisopropanolamine.

6. A polyurethane according to claim 1, and further characterized in being in the form of a rigid foam.

References Cited
UNITED STATES PATENTS

| 3,248,348 | 4/1966 | Piechota et al. | 260—2.5 |
| 3,248,349 | 4/1966 | Szabat et al. | 260—2.5 |
| 3,267,080 | 8/1966 | Kamal | 260—77.5 |

FOREIGN PATENTS

| 882,949 | 11/1961 | Great Britain | 260—2.5 |

DONALD E. CZAJA, Primary Examiner

E. C. RZUCIDLO, Assistant Examiner

U.S. Cl. X.R.

260—18 TN